Patented Jan. 13, 1925.

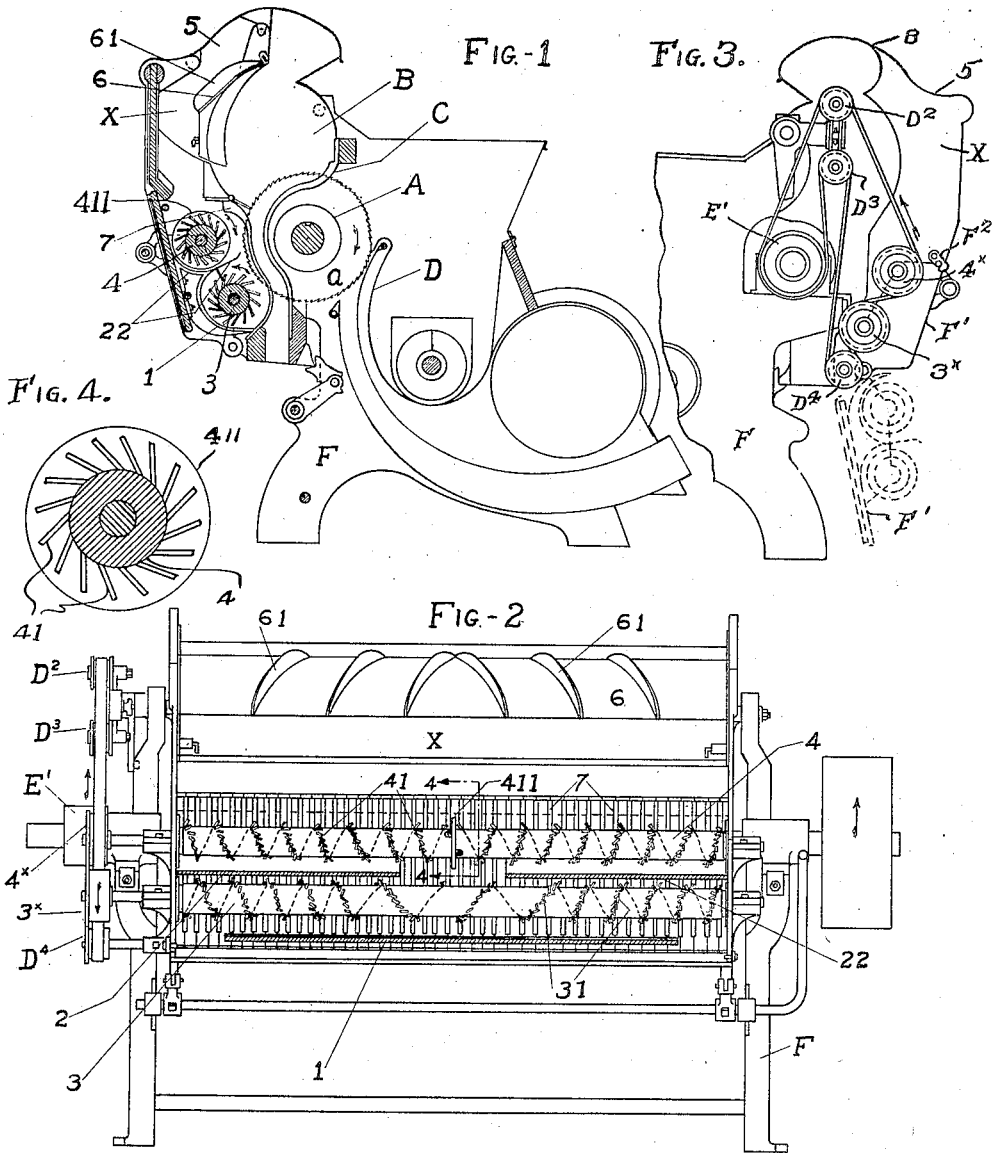

1,522,568

UNITED STATES PATENT OFFICE.

BRONSON C. WOODFORD, OF DALLAS, TEXAS, ASSIGNOR TO THE MURRAY COMPANY, OF DALLAS, TEXAS, A CORPORATION OF TEXAS.

GIN.

Application filed April 26, 1924. Serial No. 709,138.

*To all whom it may concern:*

Be it known that I, BRONSON C. WOODFORD, citizen of the United States, residing at Dallas, in the county of Dallas and State of Texas, have invented certain new and useful Improvements in Gins, of which the following is a specification.

My invention is an improvement in gins, particularly applicable to huller gins and the particular object of the invention is to feed the seed cotton to the gin toward one or both ends of the huller chamber and deliver it to a conveyor element to cause the seed cotton to be traversed along the gin saws and huller ribs and at the end of the movement delivered to a second conveyor to be traversed back again, the cotton and seeds being removed during the operation and the hulls separated and delivered at the end of the operation at the ends of the machine.

In the drawings:

Figure 1 is a cross-sectional elevation of a well known type of gin to which my improvement is applied;

Figure 2 is a longitudinal elevation of Figure 1, from the left, the huller breast front being removed;

Figure 3 is a partial end elevation of the machine, showing the belting layout, the front being shown in dotted lines in lowered position.

Figure 4 is a cross-section on an enlarged scale on line 4—4 of Figure 2, looking in the direction of the arrow.

Machines designed to separate hulls from seed cotton are old and of many forms. The ordinary means of a common form of gin are indicated in the drawings, the frame F, the saw cylinder A, roll box B, ginning ribs C, lint removing means, as an air blast D, are too well known to need particular description as my present invention is not directly concerned with these matters and may be applied to any variety of saw gin.

In my present improvement I employ, as is common, a huller feed box X, in addition to the ordinary roll box B, and this huller feed box is divided into two chambers by floor partitions 1, 2 and 22 and in each chamber is mounted for rotation a conveyor roller, roller 3 over partition 1 and roller 4 over partitions 2 and 22. At the upper or inlet opening 5 to feed box X is mounted an apron 6 fitted with slanting deflector ribs 61, adapted to guide the seed cotton in a general way, towards the ends of the feed box. The upper ends of the deflector ribs are curved and carried below the floor of the apron slide so that entering seed cotton has no tendency to catch or hang upon the upper ends of the deflector ribs. The ribbed apron is formed as a separate unit and may be secured in place in any form of huller gin. The entering seed cotton is by this means concentrated somewhat at the ends in order to get the fullest traverse along the gin saws and huller ribs, and descends to the conveyor roll 4, turning as indicated by the arrow, by which it is thrown against huller ribs 7 and saws, a, seed cotton being carried through the ribs to the roll box B while the hulls are rejected. Referring to Figure 2 it will be seen that the teeth or spikes 31 and 41 of the conveyor rolls are set in a spiral arrangement calculated not only to throw the seed cotton against the huller ribs and saws, but also to give a movement of translation, from the ends toward the center, of roll 4 and from the center to the ends of roll 3, to any seed cotton not immediately seized by the saws and in this action the partitions 1, 2, 22 sustain whatever seed cotton descends upon them, so that the picker roll may again actuate it. As the seed cotton from either end of roll 4 is moved toward the center the seed cotton is progressively removed through the huller ribs, leaving an increasing proportion of hulls, so that, when the center of roll 4 is reached the absolute quantity of seed cotton is much reduced and the proportion of hulls much increased. It will be observed (see Fig. 2) that conveyor roll 4 has two partitions beneath it, 2 and 22, one at each end, a space being left between their inner ends. Midway of roll 4 is mounted a collar 411, which stands directly over the space between partitions 2 and 22. On the upper partitions 2 and 22 and on roller 4 are two fast moving streams of material constantly approaching each other at the mid-portion of the conveyor means. These two streams encounter collar 411 which divides and keeps separate the oppositely moving streams as they approach from each end and the seed cotton lacking support of a partition and encountering the collar 411 falls upon the roll 3 revolving as indicated by the arrow in Fig. 1. The central dividing collar thus is effective in preventing a conflict of forces and a consequent choking at the meeting point, which if not prevented would cause the hulls to be cut and crushed at this point and the pieces of hull or shale would be carried through the huller ribs into the roll box with the lint, also choking the hull ribs and necessarily slowing operation. The spirals of teeth or spikes 31 at the center of roll 3 are more open than they are at the ends causing a rapid initial movement of the material received by roll 3 from roll 4, towards the ends of roll 3, gradually slowing as the ends of the roll are reached where the spirals are more closely set. The partition 1 is somewhat shorter than roll 3 so that by the time the seed cotton reaches the ends of roll 3 the residuum of hulls and a few seeds may drop off the partition and through the open bottom of the hopper or feed box X upon the floor or upon any of the well known trash conveyors, installed beneath the gin to receive and remove the hulls and trash.

In the preferred form of my improved gin I mount the conveyor rolls and the partitions upon a hinged front F¹ which, by unshipping the drive belt may be swung down to the position shown in Fig. 3 in dotted lines.

This is an important feature of my invention, enabling the rolls themselves to be easily and conveniently examined as necessary, and entirely exposing the huller ribs for any purpose necessary. I also make the upper front section of the huller chamber instantly movable by hanging that member on trunnions at its upper ends, which slip into grooves provided in the end frames of the huller chamber. In this way absolute easy access is had to all parts of the hulling mechanism.

The belt drive to give the required rotation to the conveyor rolls and other parts is also indicated in Fig. 3. E' being a drive pulley on the end of the shaft of saw cylinder A, D², D³, D⁴ being idler pulleys and 3ˣ and 4ˣ being pulleys upon the ends of the shaft of rollers 3 and 4 respectively. The motion of the belt is as indicated by the arrows.

It will also be observed (see Fig. 1) that the partitions 1, 2 and 22, are curved and this is the preferred form and these partitions extend substantially to the ribs.

I claim:

1. In a huller gin, a hulling breast having partitions dividing it into upper and lower chambers; a two-way conveyor mounted for rotation in the upper chamber and actuating material from the ends to the middle of the conveyor, to a discharge opening in the partition; an annular collar in the center of the conveyor above that opening; a two-way conveyor mounted for rotation in the lower chamber and actuating material from the middle to the ends of the conveyor to discharge openings in the partition.

2. In a huller gin, a hulling breast having an apron at its inlet opening to deflect the incoming cotton from the middle toward the ends of the opening and divided by partitions into upper and lower chambers; a two-way conveyor mounted for rotation in the upper chamber and actuating material in opposite directions to a discharge opening at the middle of the partition above the lower conveyor; that conveyor, mounted for rotation in the lower chamber and actuating material in opposite directions to discharge openings at the ends of the gin.

3. In a huller gin, a two-way conveyor mounted for rotation in the huller breast; a material supporting partition beneath the conveyor co-operating therewith and having an opening beneath the middle of the conveyor; an annular baffle mounted upon the conveyor above the opening, separating the oppositely moving streams of material.

4. In a huller gin, a huller breast having a front pivoted to swing downward; a conveyor mounted thereon for rotation; a partition mounted thereon adjacent the conveyor and beneath and co-operating therewith, when in normal position; means to connect the front to the breast in operative position.

5. In a huller gin, an inner roll box its outer surface carrying deflector ribs for dividing and guiding the stream of seed cotton from the gin feeder towards the ends of the inlet to the huller breast to deliver seed cotton at the ends of a conveyor roller working from ends to centre; that conveyor roller.

6. In a huller gin, an apron provided with deflector ribs; means to secure said apron adjacent the inlet to the huller breast, to receive seed cotton from a gin-feeder and divide and guide the stream of seed cotton towards the ends of the huller breast to deliver seed cotton at the ends of a conveyor roller working from ends to centre; that conveyor roller.

Signed at Dallas, Texas, this 21st day of April, 1924.

BRONSON C. WOODFORD.